United States Patent
Koo

(10) Patent No.: US 8,982,293 B2
(45) Date of Patent: Mar. 17, 2015

(54) DISPLAY APPARATUS AND METHOD OF MEASURING LIQUID CRYSTAL CAPACITANCE

(75) Inventor: Bonyong Koo, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 165 days.

(21) Appl. No.: 13/606,571

(22) Filed: Sep. 7, 2012

(65) Prior Publication Data
US 2013/0271677 A1   Oct. 17, 2013

(30) Foreign Application Priority Data

Apr. 12, 2012  (KR) .................. 10-2012-0038080

(51) Int. Cl.
*G02F 1/133* (2006.01)
*G02F 1/1333* (2006.01)
*G09G 3/00* (2006.01)
*G02F 1/1362* (2006.01)

(52) U.S. Cl.
CPC .. *G02F 1/1333* (2013.01); *G02F 2001/133388* (2013.01); *G02F 2001/136254* (2013.01); *G09G 3/006* (2013.01)
USPC .............................. 349/33; 349/149; 349/152

(58) Field of Classification Search
USPC ........................................ 349/33, 149, 152
See application file for complete search history.

(56) References Cited

U.S. PATENT DOCUMENTS

| 7,098,987 B1 * | 8/2006 | Jen et al. ...................... 349/152 |
| 2008/0062341 A1 | 3/2008 | Tanaka |
| 2008/0278458 A1 | 11/2008 | Masuzawa et al. |
| 2010/0171911 A1 * | 7/2010 | Anno et al. .................. 349/109 |
| 2011/0279358 A1 | 11/2011 | Lee et al. |

FOREIGN PATENT DOCUMENTS

| JP | 2003-222888 A | 8/2003 |
| JP | 2007-093846 A | 4/2007 |
| JP | 2007-256327 A | 10/2007 |
| KR | 10-0475638 B1 | 2/2005 |
| KR | 100502792 B1 | 7/2005 |

* cited by examiner

*Primary Examiner* — Lucy Chien
(74) *Attorney, Agent, or Firm* — Cantor Colburn LLP

(57) ABSTRACT

A display apparatus includes: a first substrate including display and peripheral area surrounding the display area, where the first substrate includes pixel electrodes in the display area, and dummy pixel electrodes in the peripheral area; a second substrate opposite to and coupled to the first substrate, where the second substrate includes a reference electrode facing the pixel electrodes and facing the dummy pixel electrodes; and a liquid crystal layer between the first substrate and the second substrate, where the first substrate further includes a test line electrically connected to the dummy pixel electrodes, a first pad electrode configured to apply a test voltage to the test line to measure a liquid crystal capacitance, a reference voltage line configured to receive a reference voltage from an external source, and a second pad electrode configured to apply the reference voltage to the reference voltage line to measure the liquid crystal capacitance.

17 Claims, 7 Drawing Sheets

DISPLAY APPARATUS AND METHOD OF MEASURING LIQUID CRYSTAL CAPACITANCE

This application claims priority to Korean Patent Application No. 10-2012-0038080, filed on Apr. 12, 2012, and all the benefits accruing therefrom under 35 U.S.C. §119, the content of which in its entirety is hereby incorporated by reference.

BACKGROUND

1. Field

The disclosure relates to a display apparatus and a method of measuring a liquid crystal capacitance. More particularly, the disclosure relates to a display apparatus, where a liquid crystal capacitance is effectively measured, and a method of measuring the liquid crystal capacitance.

2. Description of the Related Art

In general, a liquid crystal display includes a liquid crystal display panel to display an image. The liquid crystal display panel includes a display area, in which the image is displayed, and a peripheral area adjacent to the display area. The display area includes a plurality of gate lines, a plurality of data lines and a plurality of pixels. Each pixel includes a thin film transistor and a liquid crystal capacitor.

In the liquid crystal display, a test process is typically performed to test the liquid crystal display during a manufacturing process thereof. The test process includes testing disconnection or shorting of wires formed on the liquid crystal display panel, and measuring characteristics of a thin film transistor.

However, a liquid crystal capacitor may not be measured in the display area until the liquid crystal display panel is completed by interposing a liquid crystal layer between two substrates. Accordingly, the liquid crystal capacitor may not be efficiently tested.

SUMMARY

The disclosure provides a display apparatus, in which a liquid crystal capacitance is measured.

The disclosure provides a method of measuring the liquid crystal capacitance in the display apparatus.

An exemplary embodiment of a display apparatus includes: a first substrate including a display area, on which an image is displayed, and a peripheral area surrounding at least a portion of the display area, where the first substrate includes a plurality of pixel electrodes arranged in the display area, and a plurality of dummy pixel electrodes arranged in the peripheral area; a second substrate disposed opposite to and coupled to the first substrate, where the second substrate includes a reference electrode facing the pixel electrodes in the display area and facing the dummy pixel electrodes in the peripheral area; and a liquid crystal layer interposed between the first substrate and the second substrate. In such an embodiment, the first substrate further includes a test line electrically connected to the dummy pixel electrodes, a first pad electrode configured to apply a test voltage to the test line to measure a liquid crystal capacitance, a reference voltage line configured to receive a reference voltage from an external source, and a second pad electrode configured to apply the reference voltage to the reference voltage line to measure the liquid crystal capacitance.

An exemplary embodiment of a method of measuring a liquid crystal capacitance of a display apparatus includes preparing a first substrate including a display area, in which an image is displayed, and a peripheral area surrounding at least a portion of the display area, where the first substrate comprises a plurality of pixels arranged in the display area, and a plurality of dummy pixel electrodes arranged in the peripheral area; preparing a second substrate including a reference electrode facing the pixel electrodes in the display area and facing the dummy pixel electrodes in the peripheral area; providing a liquid crystal layer between the first and second substrates; applying a reference voltage and a test voltage to the reference electrode and the dummy pixel electrodes, respectively, to measure the liquid crystal capacitance; and controlling a voltage level of the reference voltage based on the measured liquid crystal capacitance.

According to one or more exemplary embodiment, the liquid crystal capacitance may be measured using the dummy pixel electrodes disposed on the first substrate. Thus, a kickback voltage is estimated and a voltage level of the reference voltage applied to the reference electrode is controlled based thereon such that display characteristics of the display apparatus are improved.

BRIEF DESCRIPTION OF THE DRAWINGS

The above and other features of the invention will become readily apparent by reference to the following detailed description when considered in conjunction with the accompanying drawings wherein.

DETAILED DESCRIPTION

Figure 1:
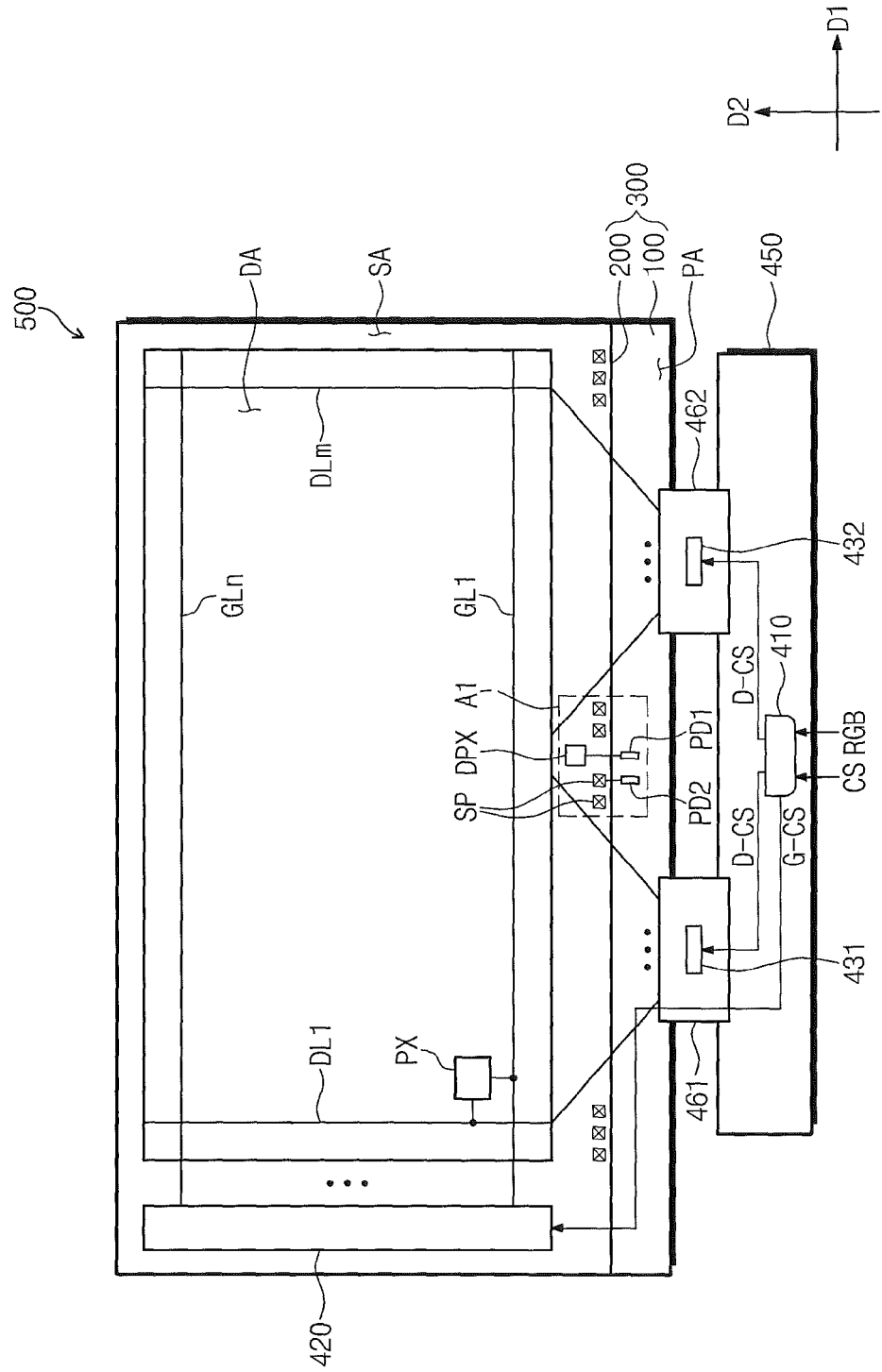
FIG. 1 is a block diagram showing an exemplary embodiment of a display apparatus according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

Figure 2:
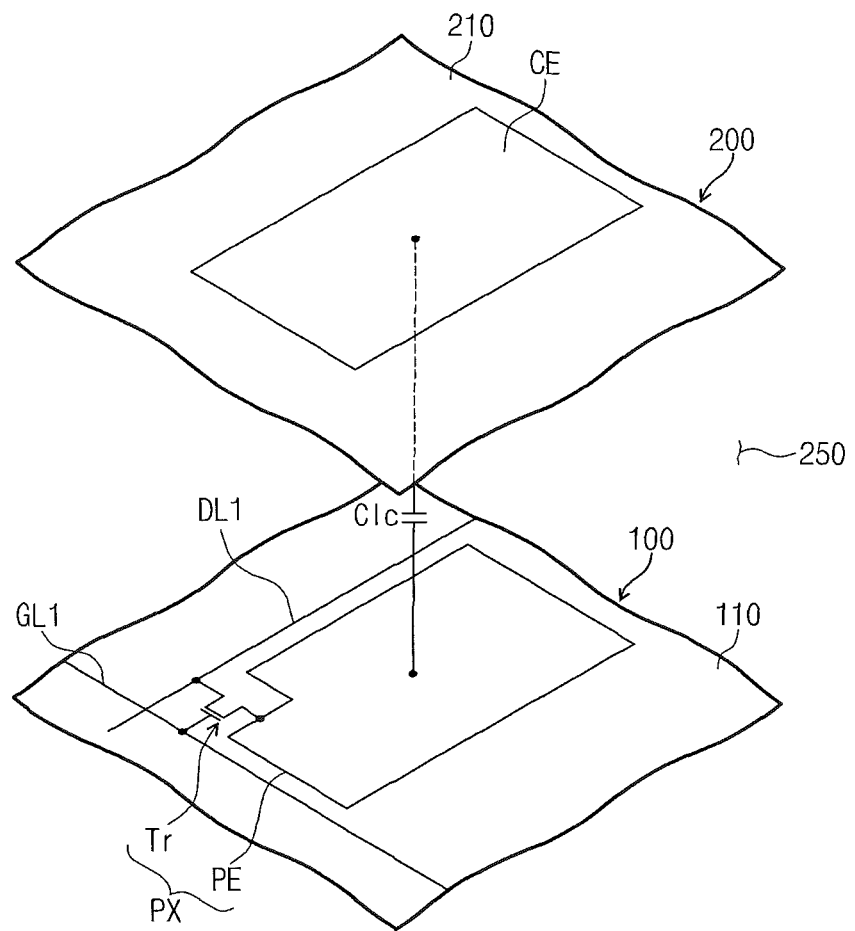
FIG. 2 is an equivalent circuit diagram of a pixel shown in FIG. 1.

FIG. 1 is a block diagram showing an exemplary embodiment of a display apparatus according to the invention, and FIG. 2 is an equivalent circuit diagram showing a pixel of FIG. 1.

Referring to FIGS. 1 and 2, a display apparatus 500 includes a display panel 300 displaying an image. The display panel 300 includes a first substrate 100, a second substrate 200 opposite to, e.g., facing, the first substrate 100, and a liquid crystal layer 250 interposed between the first substrate 100 and the second substrate 200.

The first substrate 100 includes a first base substrate 110, and a plurality of gate lines, e.g., first to n-th gate lines GL1 to GLn, a plurality of data lines, e.g., first to m-th data line DL1 to DLm, and a plurality of pixels PX, which are arranged on the first base substrate 110. Each of the pixels PX includes a thin film transistor Tr and a pixel electrode PE.

The gate lines GL1 to GLn extend in a first direction D1 and arranged in a second direction D2 that is substantially perpendicular to the first direction D1. The data lines DL1 to DLm extend in the second direction D2 and arranged in the first direction D1 to be parallel with each other.

As shown in FIG. 2, the thin film transistor Tr includes a gate electrode electrically connected to a corresponding gate line (e.g., the first gate line GL1) of the gate lines GL1 to GLn, a source electrode electrically connected to a corresponding data line (e.g., the first data line DL1) of the data lines DL1 to DLm, and a drain electrode electrically connected to the pixel electrode PE.

The second substrate 200 includes a second base substrate 210 facing the first base substrate 110 and a reference electrode CE disposed on the second base substrate 210 to face the pixel electrode PE. In an exemplary embodiment, the second substrate 200 may further include a color filter layer (not shown) and a black matrix (not shown). In an exemplary embodiment, the reference electrode CE may be integrally formed as a single unitary and indivisible unit over an entire surface of the second base substrate 210, but not being limited thereto.

The reference electrode CE and the pixel electrode PE define a liquid crystal capacitor Clc with the liquid crystal layer 250 interposed therebetween.

Referring again to FIG. 1, the display apparatus 500 further includes a timing controller 410, a gate driver 420 and data drivers, e.g., a first data driver 431 and a second data driver 432. The timing controller 410 receives a plurality of image signals RGB and a plurality of control signals CS from an external source (not shown). The timing controller 410 converts a data format of the image signals RGB to a data format corresponding to an interface between the timing controller 410 and the data drivers 431 and 432 and provides the converted image signals to the data drivers 431 and 432. In an exemplary embodiment, the timing controller 410 generates a data control signal D-CS (e.g., an output start signal, a horizontal start signal, etc.) and a gate control signal G-CS (e.g., a vertical start signal, a vertical clock signal, a vertical clock bar signal, etc.) based on the control signals CS. The data control signal D-CS is applied to the data drivers 431 and 432, and the gate control signal G-CS is applied to the gate driver 420.

In an exemplary embodiment, the gate driver 420 sequentially outputs a gate signal in response to the gate control signal G-CS provided from the timing controller 410. In such an embodiment, the pixels PX may be scanned according to rows of the pixels by the gate signal.

The data drivers 431 and 432 convert the converted image signals to data signals in response to the data control signal D-CS provided from the timing controller 410 and output the data signals. The data signals are applied to the pixels PX through the data lines DL1 to DLm.

In such an embodiment, each of the pixels PX is turned on in response to the gate signal, and the turned-on pixel PX receives a corresponding data signal from the data drivers 431 and 432 to display an image.

As shown in FIG. 1, when viewed in a plan view, the display panel 300 is divided into a display area DA, in which the image is displayed, and a peripheral area SA surrounding at least a portion of the display area DA. The peripheral area SA is an area covered by the black matrix and on which no image is displayed.

In an exemplary embodiment, the gate driver 420 may be disposed in the peripheral area SA. In such an embodiment, the gate driver 420 may be provided, e.g., directly formed, on the first base substrate 110 corresponding to the peripheral area SA through a thin film process and covered by the black matrix disposed on the second base substrate 210.

The display apparatus 500 further includes a printed circuit board 450 arranged adjacent to the display panel 300. The timing controller 410 may be disposed, e.g., mounted, on the printed circuit board 450 in the form of a chip. In an exemplary embodiment, the printed circuit board 450 may be electrically connected to the display panel 300 through a flexible film, for example, tape carrier package ("TCP"). In such an embodiment, the gate control signal G-CS output from the timing controller 410 may be applied to the gate driver 420 through the TCP.

In an exemplary embodiment, where the display apparatus 500 may include a first TCP 461 and a second TCP 462, the first and second data drivers 431 and 432 are referred to as a first data driving chip 431 and a second data driving chip 432, which are mounted on the first TCP 461 and the second TCP 462, respectively. In such an embodiment, the data control signal D-CS provided from the timing controller 410 may be applied to the first and second data driving chips 431 and 432 through the first and second TCPs 461 and 462, respectively.

In an exemplary embodiment, the display panel 300 further includes a pad area PA which is an elongated portion of the first substrate 100 outward from the peripheral area SA. The first and second TCPs 461 and 462 are attached to the pad area PA. In such an embodiment, the data signals output from the first and second data driving chips 431 and 432 may be applied to the data lines DL1 to DLm through the first and second TCPs 461 and 462 attached to the pad area PA.

In an exemplary embodiment, the first substrate 100 includes a reference voltage line (not shown) applied with a reference voltage from the printed circuit board 450, and the reference electrode CE disposed on the second substrate 200 is electrically connected to the reference voltage line (not shown) at a plurality of short points SP. A conductive spacer (not shown) is disposed at each of the short points SP. Therefore, the reference electrode CE is electrically connected to the reference voltage line by the conductive spacer to receive the reference voltage.

In an exemplary embodiment, as shown in FIG. 1, the short points SP may be arranged in an area between the first TCP 461 and the second TCP 462, a left area of the first TCP 461, and a right area of the second TCP 462.

According to an exemplary embodiment, a dummy pixel group DPX is provided on the first substrate 100 to correspond to the peripheral area SA. The dummy pixel group DPX includes a plurality of dummy pixel electrodes (not shown). The dummy pixel group DPX will be described later in detail with reference to FIGS. 3 to 7.

In an exemplary embodiment, the dummy pixel group DPX is electrically connected to a first pad electrode PD1 disposed in the pad area PA to receive a test voltage. In such an embodiment, the pad area PA may further include a second pad electrode PD2 electrically connected to the reference voltage line at the short points SP and applied with the reference voltage.

The first and second pad electrodes PD1 and PD2 are used to measure a capacitance of the liquid crystal capacitor Clc of the display panel 300 during a manufacturing process before the printed circuit board 450, the first TCP 461 and the second TCP 462 are electrically connected to the display panel 300. In an exemplary embodiment, the first pad electrode PD1 is applied with a data voltage in accordance with a gray-scale level as the test voltage, and the second pad electrode PD2 is applied with the reference voltage to measure the capacitance of the liquid crystal capacitor Clc.

Figure 3:
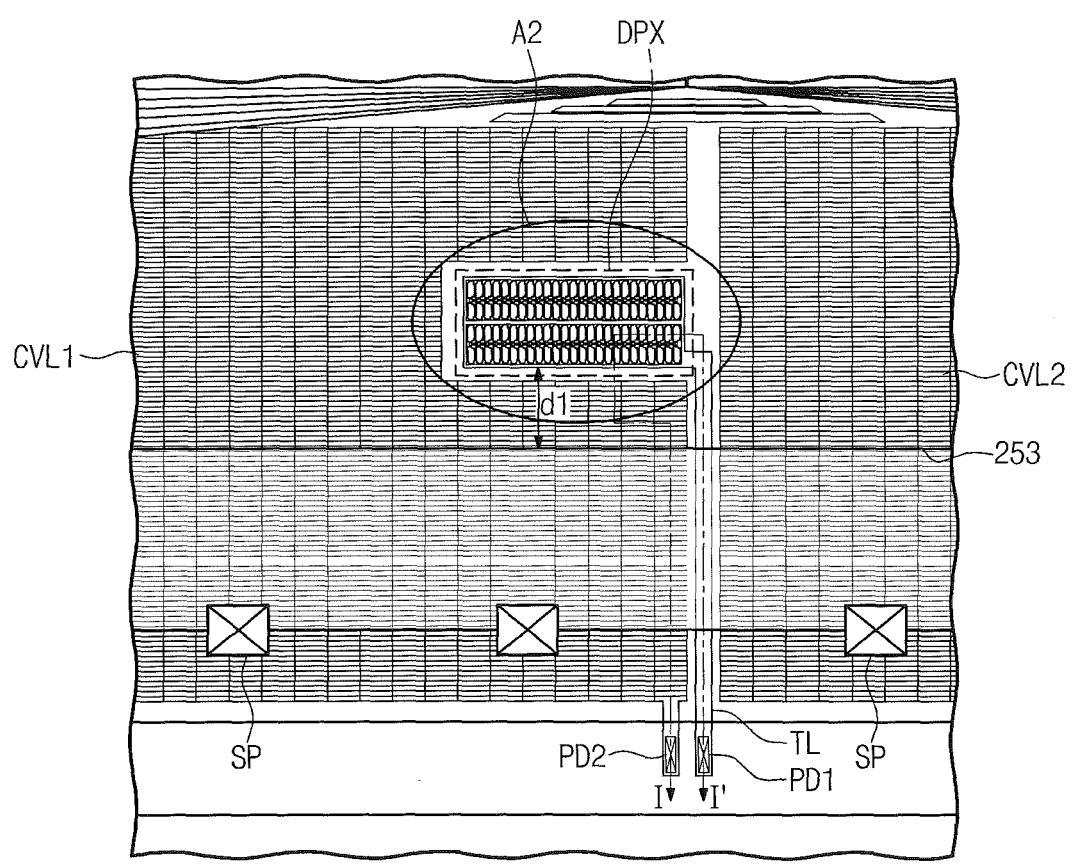
FIG. 3 is an enlarged view of a portion of A1 of FIG. 1.

FIG. 3 is an enlarged view of a portion of A1 of FIG. 1.

Referring to FIG. 3, the first substrate 100 includes a first reference voltage line CVL1 that receives the reference voltage from the first TCP 461 (shown in FIG. 1) and a second reference voltage line CVL2 that receives the reference voltage from the second TCP 462.

The first and second reference voltage lines CVL1 and CVL2 are electrically connected to the reference electrode CE disposed on the second substrate 200 at the short points SP. The short points SP may be spaced apart from each other with a predetermined distance therebetween.

In an exemplary embodiment, a portion of the first reference voltage line CVL1 is opened, and the dummy pixel group DPX is disposed on the opened area of the first reference voltage line CVL1. The dummy pixel group DPX includes a test line TL including substantially the same material and disposed in the same layer as the first reference voltage line CVL1 and a plurality of dummy pixel electrodes DPE (shown in FIG. 5) electrically connected to the test line TL. In one exemplary embodiment, for example, the dummy pixel group DPX may include about one hundred dummy pixel electrodes DPE.

The display panel 300 may further include a sealant 253 interposed between the first and second substrates 100 and 200 to couple the first and second substrates 100 and 200 to each other and seal the liquid crystal layer 250 between the first and second substrates 100 and 200.

The sealant 253 is provided in the peripheral area PA of the display panel 300. In an exemplary embodiment, the sealant 253 and the dummy pixel group DPX are spaced apart from each other with a predetermined distance d1 when viewed from a top view, and thus not overlapping each other. In an exemplary embodiment, when an area where the sealant 253 is disposed is referred to as a seal line, the dummy pixel group DPX may be spaced apart from the seal line by a distance equal to or greater than about 0.4 millimeter (mm) in consideration of fabrication-error-tolerance.

When the sealant 253 overlaps the dummy pixel group DPX, the sealant 253 may be interposed between the reference electrode CE and a portion of the dummy pixel electrodes DPE arranged in the dummy pixel group DPX instead of the liquid crystal layer 250 such that the capacitance of the liquid crystal capacitor Clc may not be precisely measured. In an exemplary embodiment, the dummy pixel group DPX and the sealant 253 are spaced apart from each other by the predetermined distance such that the capacitance of the liquid crystal capacitor Clc is effectively measured.

Figure 4:
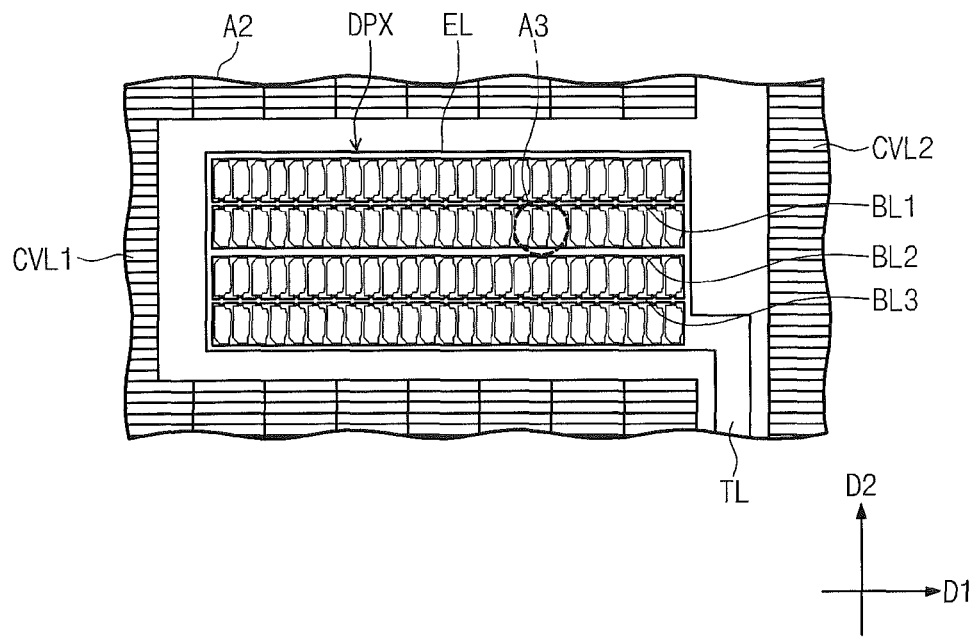
FIG. 4 is an enlarged view of a portion of A2 of FIG. 3.
Figure 5:
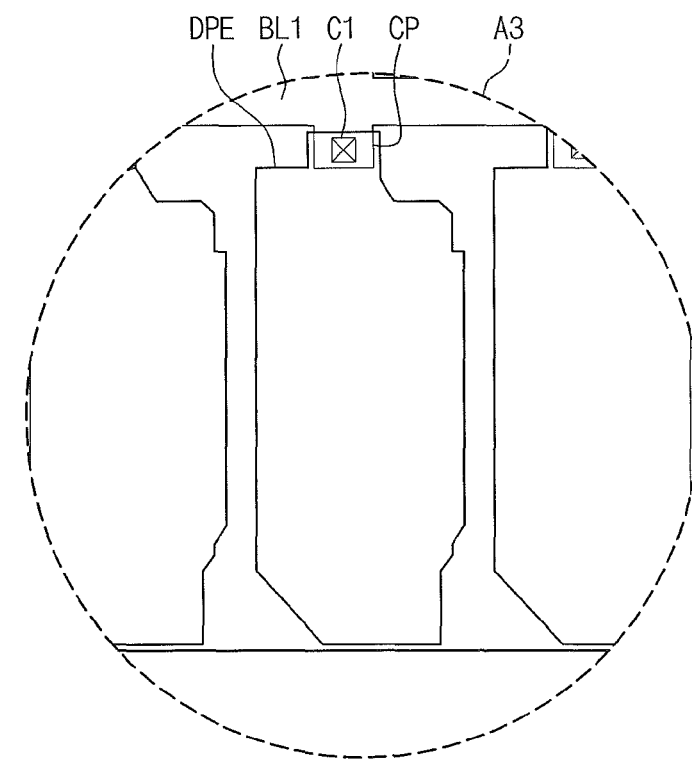
FIG. 5 is an enlarged view of a portion of A3 of FIG. 4.

FIG. 4 is an enlarged view of a portion of A2 of FIG. 3, and FIG. 5 is an enlarged view of a portion of A3 of FIG. 4.

Referring to FIGS. 4 and 5, in an exemplary embodiment, the dummy pixel group DPX includes about one hundred dummy pixel electrodes DPE and the test line TL. In one exemplary embodiment, the dummy pixel electrodes DPE may be arranged in a matrix form having four rows and twenty-five columns, for example.

The test line TL includes an external line EL that defines an area in which the dummy pixel group DPX is disposed, a first branch line BL1, a second branch line BL2 and a third branch line BL3, which are branched from the external line EL and extending in the first direction D1. The test line TL is electrically connected to the first pad electrode PD1 (shown in FIG. 3). The first to third branch lines BL1, BL2 and BL3 divide an area, which is defined as a rectangular shape by the external line EL, into four areas.

In an exemplary embodiment, the first branch line BL1 is electrically connected to a first dummy pixel row positioned at an upper portion with respect to the first branch line BL1 and electrically connected to a second dummy pixel row positioned at a lower portion with respect to the first branch line BL1. In such an embodiment, the third branch line BL3 is electrically connected to a third dummy pixel row positioned at an upper portion with respect to the third branch line BL3 and electrically connected to a fourth dummy pixel row positioned at a lower portion with respect to the third branch line BL3.

In an exemplary embodiment, the external line EL, the first to third branch lines BL1, BL2 and BL3 may be integrally formed as a single unitary and indivisible unit.

As shown in FIG. 5, the first branch line BL1 includes a plurality of contact portions CP overlapping the dummy pixel electrodes DPE of each dummy pixel row. The dummy pixel electrodes DPE of each dummy pixel row overlap contact portions CP of a corresponding branch line. The contact portions CP are exposed through contact holes C1, and each of the dummy pixel electrodes DPE is electrically connected to a corresponding contact portion CP through a corresponding contact hole of the contact holes C1.

In such an embodiment, the test voltage provided through the test line TL may be applied to the dummy pixel electrodes DPE sequentially via the external line EL, the first branch line BL1 and the contact portions CP.

In an exemplary embodiment, the third branch line BL3 is electrically connected to the dummy pixel electrodes DPE in the same way as the first branch line BL1, show in FIG. 5.

In an exemplary embodiment, the dummy pixel electrodes DPE may include a transparent conductive material, such as indium tin oxide ("ITO"). In an exemplary embodiment, the dummy pixel electrodes DPE may have substantially the same shape and area as a shape and an area of the pixel electrodes PE (shown in FIG. 2) arranged in the display area DA, and the dummy pixel electrodes DPE may include the same material as the pixel electrodes PE.

Figure 6:
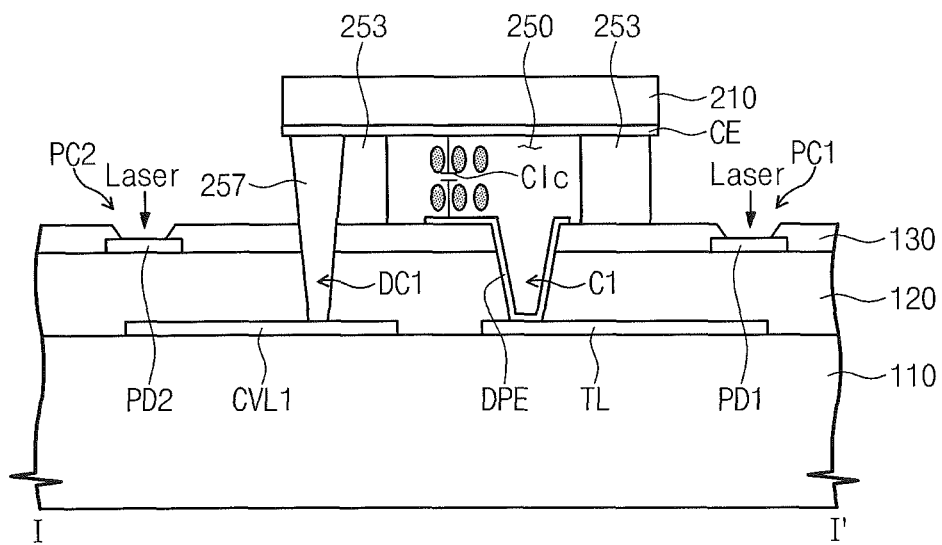
FIG. 6 is a cross-sectional view taken along line I-I' of FIG. 3.
Figure 7:
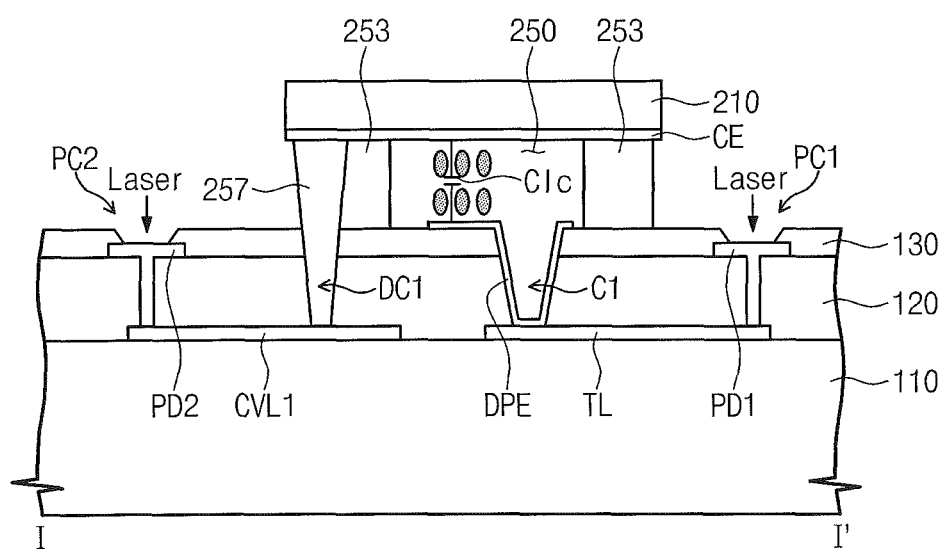
FIG. 7 is a cross-sectional view of an exemplary embodiment of a first pad electrode and a second pad electrode after a laser beam is irradiated thereon.

FIG. 6 is a cross-sectional view taken along line I-I' of FIG. 3, and FIG. 7 is a cross-sectional view of an exemplary embodiment of the first pad electrode and the second pad electrode after a laser beam is irradiated thereon.

Referring to FIG. 6, the first base substrate 110 includes the first reference voltage line CVL1 and the test line TL, which are formed of a first metal material. As described above, the test line TL includes the external line EL, and the first to third branch lines BL1 to BL3, but for the convenience of explanation, the test line TL is not classified into the lines in FIG. 6.

The first reference voltage line CVL1 and the test line TL are covered by a gate insulating layer 120. The first pad electrode PD1 and the second pad electrode PD2, which are formed of a second metal material, are formed on the gate insulating layer 120. The first pad electrode PD1 partially overlaps the test line TL, and the second pad electrode PD2 is partially overlapped with the first reference voltage line CVL1.

The gate insulating layer 120, the first pad electrode PD1 and the second pad electrode PD2 are covered by a protective layer 130. In an exemplary embodiment, a first pad contact hole PC1 is formed through the protective layer 130 and exposes the first pad electrode PD1, and a second pad contact hole PC2 is formed through the protective layer 130 and exposes the second pad electrode PD2.

A contact hole C1 is formed through the gate insulating layer 120 and the protective layer 130 and exposes an end portion of the test line TL. The contact hole C1 is substantially the same as the contact hole C1 shown in FIG. 5.

In an exemplary embodiment, a dummy contact hole DC1 is formed through the gate insulating layer 120 and the protective layer 130 and exposes an end portion of the first reference voltage line CVL1.

In an exemplary embodiment, the dummy pixel electrode DPE is formed on the protective layer 130. The dummy pixel electrode DPE is electrically connected to the test line TL through the contact hole C1. In such an embodiment, the dummy pixel electrode DPE is disposed opposite to the reference electrode CE disposed on the second base substrate 210 while the liquid crystal layer 250 is interposed therebetween such that the liquid crystal capacitor Clc is collectively defined by the dummy pixel electrode DPE and the reference electrode CE with the liquid crystal layer 250 therebetween.

A conductive spacer 257 is disposed corresponding to the dummy contact hole DC1. The conductive spacer 257 electrically connects the first reference voltage line CVL1 and the reference electrode CE and applies the reference voltage provided to the first reference voltage line CVL1 to the reference electrode CE.

In an exemplary embodiment, the sealant 253 is interposed between the first substrate 100 and the second substrate 200. The dummy pixel electrode DPE is spaced apart from the sealant 253 with the predetermined distance.

In an exemplary embodiment, a laser beam is irradiated onto the first pad electrode PD1 and the second pad electrode PD2 to measure the capacitance of the liquid crystal capacitor Clc. Then, as shown in FIG. 7, the first pad electrode PD1 is electrically connected to the test line TL disposed under the first pad electrode PD1, and the second pad electrode PD2 is electrically connected to the first reference voltage line CVL1 disposed under the second pad electrode PD2.

In an exemplary embodiment, during the measuring process of the capacitance of the liquid crystal capacitor Clc, the first pad electrode PD1 and the second pad electrode PD2 are electrically connected to the test line TL and the first reference voltage line CVL1, respectively, by the irradiation of the laser beam, and the corrosion of the first and second pad electrodes PD1 and PD2 is reduced compared to an embodiment having a structure in which the first and second pad electrodes PD1 and PD2 are constantly electrically connected to the test line TL and the first reference voltage line CVL1.

The test voltage applied to the first pad electrode PD1 is provided to the dummy pixel electrode DPE via the test line TL, and the reference voltage applied to the second pad electrode PD2 is provided to the reference electrode CE via the first reference voltage line CVL1 and the conductive spacer 257. The liquid crystal capacitor Clc is formed between the dummy pixel electrode DPE and the reference electrode CE by the test voltage and the reference voltage.

As shown in FIG. 4, the dummy pixel group DPX includes one hundred dummy pixel electrodes DPE. In such an embodiment, the capacitance of the liquid crystal capacitor formed between the dummy pixel electrodes DPE and the reference electrode CE is measured, the measured capacitance is divided by the number of the dummy pixel electrodes (e.g., about one hundred), and the capacitance of a liquid crystal capacitor Clc is thereby calculated.

In an exemplary embodiment, a voltage level of the reference voltage applied to the reference electrode CE for an operation of the display apparatus 500 may be controlled based on the calculated liquid crystal capacitance.

In general, a kickback voltage Vkb of the display apparatus 500 satisfies the following equation.

$$Vkb = \frac{Cgs}{Cgs + Cst + Clc}\Delta Vg$$

In the equation above, Cgs denotes a parasitic capacitor between the gate electrode and the source electrode of the thin film transistor Tr shown in FIG. 2, Cst denotes a storage capacitor disposed in each pixel PX, Clc denotes the liquid crystal capacitor, and ΔVg denotes a difference value between a gate-on voltage and a gate-off voltage which are applied to the gate electrode of the thin film transistor Tr.

As shown in the above equation, the level of the kickback voltage Vkb is changed in accordance with the capacitance of the liquid crystal capacitor Clc.

In an exemplary embodiment, the capacitance of the liquid crystal capacitor Clc is measured using the dummy pixel group DPX, and the level of the kickback voltage Vkb may be estimated using the measured capacitance. In such an embodiment, the level of the reference voltage is controlled or adjusted based on the level of the kickback voltage Vkb, and a brightness deviation according to the pixels or a brightness deviation according to the polarity of the data voltage due to the kickback voltage Vkb is thereby reduced.

In such an embodiment, the capacitance of each of the parasitic capacitor Cgs and the storage capacitor Cst may be also measured using a test pad that is preformed on the first substrate 100. The capacitance of the parasitic capacitor Cgs and the storage capacitor Cst may be measured before the first and second substrates 100 and 200 are coupled to each other. However, the capacitance of the liquid crystal capacitor Clc may not be measured until the liquid crystal layer 250 is provided between the first and second substrates 100 and 200 coupled to each other. In an exemplary embodiment, the capacitance of the liquid crystal capacitor Clc is measured using the dummy pixel group DPX, such that the kickback voltage Vkb is estimated.

Figure 8:
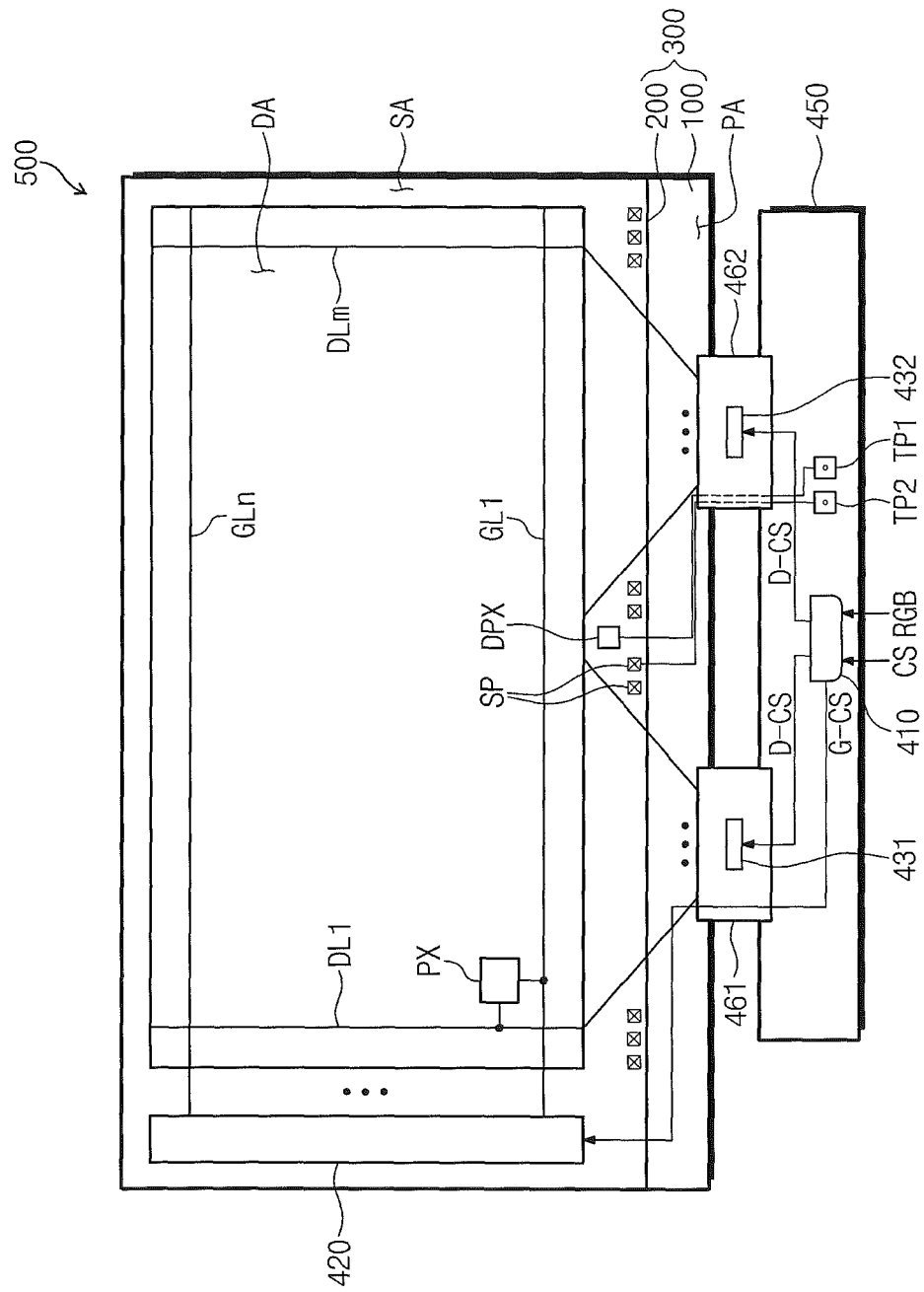
FIG. 8 is a block diagram showing an alternative exemplary embodiment of a display apparatus according to the invention.
Figure 9:
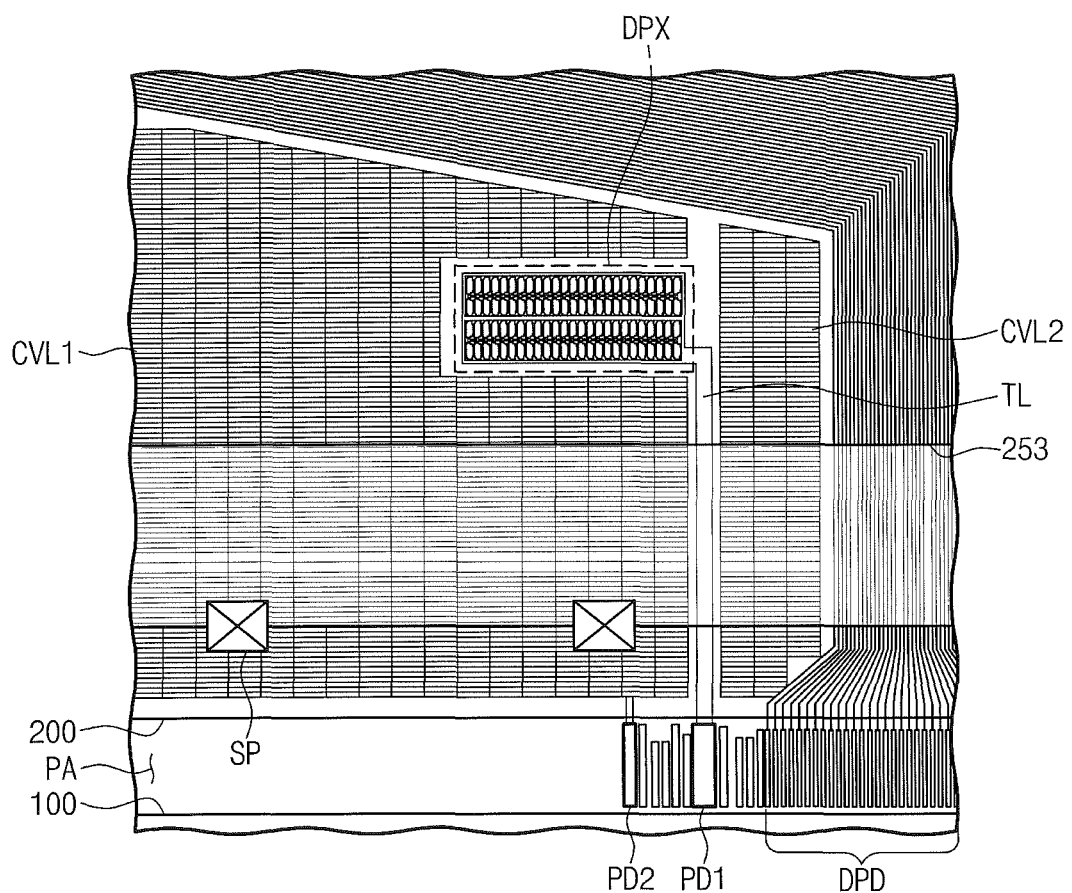
FIG. 9 is an enlarged view of a portion of the display apparatus of FIG. 8.

FIG. 8 is a plan view of an alternative exemplary embodiment of a display apparatus according to the invention, and FIG. 9 is an enlarged view of a portion of the display apparatus of FIG. 8. In FIGS. 8 and 9, the same reference numerals denote the same or like elements in FIGS. 1 to 3, and any repetitive detailed descriptions thereof will be omitted.

Referring to FIGS. 8 and 9, in an exemplary embodiment, the first pad electrode PD1 and the second pad electrode PD2 are arranged in an area where the second TCP 462 is bonded to the pad area PA of the display panel 300. The first and second pad electrodes PD1 and PD2 may be arranged outside an area where data pads DPD connected to the data lines DL1 to DLm are formed in the display area DA.

In such an embodiment, the printed circuit board 450 includes a first test pad TP1 and a second test pad TP2, which are electrically connected to the first pad electrode PD1 and the second pad electrode PD2, respectively. The second TCP 462 may include a connection line that connects the first and second pad electrodes PD1 and PD2 to the first and second test pads TP1 and TP2, respectively.

During the test process of measuring the capacitance of the liquid crystal capacitor Clc, the test voltage and the reference voltage are applied to the first test pad TP1 and the second test pad TP2, respectively.

According to an exemplary embodiment, as shown in FIG. 1, the test process is performed before the first TCP 461 and the second TCP 462 are attached to the display panel 300. In an alternative exemplary embodiment, as shown in FIG. 8, the test process is performed after the first TCP 461 and the second TCP 462 are attached to the display panel 300 to be electrically connected to the printed circuit board 450.

The processes, such as measuring the capacitance of the liquid crystal capacitor Clc, controlling the reference voltage using the measured capacitance, for example, in the exemplary embodiment of FIGS. 8 and 9 are substantially the same as those of the exemplary embodiment shown in FIGS. 1 to 7, and thus any repetitive detailed description thereof will be omitted.

Although a few exemplary embodiments of the invention have been described, it is understood that the invention should not be limited to these exemplary embodiments but various changes and modifications may be made by one ordinary skilled in the art within the spirit and scope of the invention as hereinafter claimed.

What is claimed is:

1. A display apparatus comprising:
    a first substrate comprising a display area, on which an image is displayed, and a peripheral area surrounding at least a portion of the display area, wherein the first substrate further comprises:
    a plurality of pixel electrodes arranged in the display area; and
    a plurality of dummy pixel electrodes arranged in the peripheral area;
    a second substrate disposed opposite to and coupled to the first substrate, wherein the second substrate comprises:
    a reference electrode facing the pixel electrodes in the display area and facing the dummy pixel electrodes in the peripheral area; and
    a liquid crystal layer interposed between the first substrate and the second substrate,
    wherein the first substrate further comprises:
    a test line electrically connected to the dummy pixel electrodes;
    a first pad electrode configured to apply a test voltage to the test line to measure a liquid crystal capacitance;
    a reference voltage line configured to receive a reference voltage from an external source; and
    a second pad electrode configured to apply the reference voltage to the reference voltage line to measure the liquid crystal capacitance.

2. The display apparatus of claim 1, wherein
    the first substrate further comprises a pad area which is an elongated portion of the first substrate outwardly from the peripheral area, and
    the first and second pad electrodes are disposed in the pad area.

3. The display apparatus of claim 2, further comprising:
an insulating layer interposed between the first pad electrode and the test line, and between second pad and the reference voltage line,
wherein
the first pad electrode overlaps the test line,
the second pad electrode overlaps the reference voltage line, and
the first pad electrode and the second pad electrode are configured to be electrically connected to the test line and the reference electrode, respectively, to measure the liquid crystal capacitance.

4. The display apparatus of claim 2, further comprising:
a flexible film attached to the pad area of the first substrate; and
a printed circuit board which applies a control signal to the flexible film.

5. The display apparatus of claim 4, wherein
the printed circuit board comprises:
a first test pad electrically connected to the first pad electrode; and
a second test pad electrically connected to the second pad electrode, and
the first and second test pads are electrically connected to the first and second pad electrodes, respectively, by the flexible film.

6. The display apparatus of claim 4, further comprising:
a driving chip configured to apply a driving signal to the first substrate in response to the control signal.

7. The display apparatus of claim 6, wherein the driving chip is disposed on the flexible film.

8. The display apparatus of claim 1, further comprising:
a coupling member interposed between the first substrate and the second substrate and disposed in the peripheral area,
wherein the coupling member couples the first and second substrates to each other.

9. The display apparatus of claim 8, wherein a distance between the coupling member and the dummy pixel electrode is equal to or greater than about 0.4 millimeter when viewed from a top view.

10. A method of measuring a liquid crystal capacitance of a display apparatus, the method comprising:
preparing a first substrate comprising a display area, in which an image is displayed, and a peripheral area surrounding at least a portion of the display area, wherein the first substrate further comprises a plurality of pixels arranged in the display area, and a plurality of dummy pixel electrodes arranged in the peripheral area;
preparing a second substrate including a reference electrode facing the pixel electrodes in the display area and facing the dummy pixel electrodes in the peripheral area;
providing a liquid crystal layer between the first and second substrates;
applying a reference voltage and a test voltage to the reference electrode and the dummy pixel electrodes, respectively, to measure the liquid crystal capacitance; and
controlling a voltage level of the reference voltage based on the measured liquid crystal capacitance.

11. The method of claim 10, wherein the first substrate further comprises:
a test line electrically connected to the dummy pixel electrodes;
a first pad electrode configured to apply the test voltage to the test line to measure the liquid crystal capacitance;
a reference voltage line which receives the reference voltage from an external source; and
a second pad electrode configured to apply the reference voltage to the reference voltage line to measure the liquid crystal capacitance.

12. The method of claim 11, wherein
the first substrate further comprises a pad area in an elongated portion of the first substrate outwardly from the peripheral area, and
the first and second pad electrodes are arranged in the pad area.

13. The method of claim 11, further comprising:
providing an insulating layer between the first pad electrode and the test line, and between second pad and the reference voltage line, wherein the first pad electrode overlaps the test line, and the second pad electrode overlaps the reference voltage line; and
electrically connecting the first pad electrode and the second pad electrode to the test line and the reference electrode, respectively, by irradiating a laser beam onto the first and second pad electrodes to measure the liquid crystal capacitance.

14. The method of claim 10, further comprising:
providing a coupling member between the first and second substrates in the peripheral area to couple the first and second substrates to each other.

15. The method of claim 14, wherein a distance between the coupling member and the dummy pixel electrode is equal to or greater than about 0.4 millimeter when viewed from a top view.

16. The display apparatus of claim 1, wherein the reference electrode and the pixel electrode define a liquid crystal capacitor with the liquid crystal layer interposed therebetween.

17. The method of claim 10, wherein the reference electrode and the pixel electrode define a liquid crystal capacitor with the liquid crystal layer interposed therebetween.

* * * * *